J. P. PALLANSCH.
GREEN PEA CLEANER.
APPLICATION FILED AUG. 5, 1916.
1,298,086.
Patented Mar. 25, 1919.
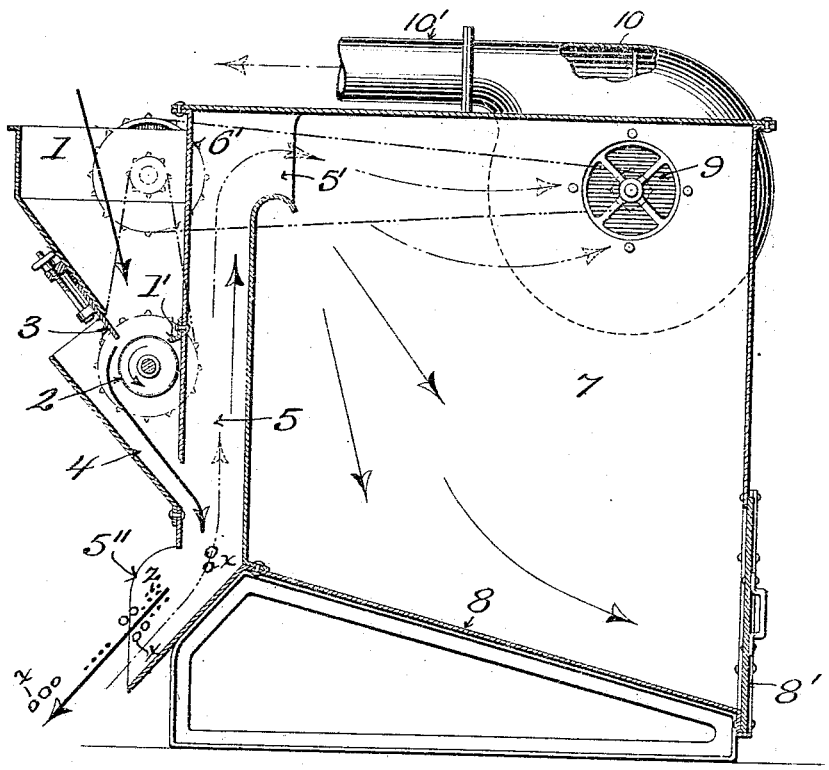

UNITED STATES PATENT OFFICE.

JOHN PETER PALLANSCH, OF FREDONIA, WISCONSIN.

GREEN-PEA CLEANER.

1,298,086. Specification of Letters Patent. Patented Mar. 25, 1919.

Application filed August 5, 1916. Serial No. 113,216.

*To all whom it may concern:*

Be it known that I, JOHN PETER PALLANSCH, a citizen of the United States, and resident of Fredonia, in the county of Ozaukee and State of Wisconsin, have invented certain new and useful Improvements in Green-Pea Cleaners; and I do hereby declare that the following is a full, clear, and exact description thereof.

My invention has for its object to provide a simple, economical and effective cleaning machine for green peas or the like. The machine essentially embodies means for admitting green peas to a gravity chute in a thin stream across the deflected mouth intake of the chute, whereby the layer of peas commingled with refuse is subjected to a current of air traveling in the opposite direction so as to comb or separate all light trash from them by the air entering at the intake mouth of the chute. This trash-laden air is caused to rise to the upper portion of the chute and is discharged from the delivery mouth of the same into a vacuum chamber, whereby the foreign products collected in the current of air are caused to drop into what might be termed a settling compartment of the chamber. A partial vacuum is developed in the chamber by a suitable suction fan or fans and they may be under valve control, whereby the volume of air displaced by them is regulated. The current of air from the delivery intake of the chute laden with refuse is caused to travel across the top portion of said chamber so as not to disturb the refuse already collected that is deposited upon the bottom thereof. The refuse is given ample time to settle into the chamber in its travel across said chamber, whereby it will drop by gravity in what might be termed the settling compartment, it being understood that the delivery mouth of the chute and the intake mouth of the fan are spaced apart so as to cause a travel of air as stated. The peas which are treated by my novel cleaner, in practice are delivered to the machine from what is known to the canning industry as a "viner". This machine is of the threshing type and separates the peas from the vines and, to a large extent, hulls them. Hence the pea product delivered to my machine consists of hulled peas, full unbroken pods, leaves or other trash, and sand. The loose peas and full pods, in their travel through my machine, are cleaned of all foreign matter with the exception of, probably, heavy sand, etc., and after being so cleaned by air, the product consisting of cleaned hulled peas and full pods, are delivered to a grading and separating apparatus of any well-known type, whereby the pods and hulled peas and sand are separated in the usual manner due to their travel over a series of screening sieves of different caliber.

With the above object in view the invention consists in certain peculiarities of construction and combination of parts as set forth hereinafter with reference to the accompanying illustration and subsequently claimed.

The drawing illustrates one example of a cleaning machine made in accordance with my invention, the same being a longitudinal sectional view through said machine to clearly illustrate all of the features.

Referring by characters to the drawings, 1 represents a receiving hopper at the open discharge of which is mounted a roller 2, the said roller constituting a revoluble bottom to sustain the load of peas thereover. A screw-controlled gate 3 is slidably mounted upon one wall of the hopper and the space between the lower edge of this gate and the surface of the roller determines the feed opening. Hence the volume of the product traveling through the machine can be nicely regulated.

The roller is arranged to travel in the direction of the arrow as shown and its rear surface is partly incased by a lip 1', whereby the product contained in the hopper is held in a position to be readily discharged. This roller 2 is mounted in a boot 4, the upper end of which is open and the lower end communicates with a discharge chute 5. The hopper and boot, as shown, are suitably attached to the front wall 6 of a rectangular chamber 7. The chamber is provided with a settling compartment as indicated at 8 at the bottom thereof and a clean-out door 8'. The chute 5 is positioned within the settling chamber and rises vertically from the bottom thereof to its top portion, where it is turned to form a horizontally discharging delivery mouth 5'. The lower end of the chute is provided with an angularly positioned intake mouth 5", whereby air is admitted to the chute and the material to be cleaned is discharged therefrom by gravity, the material and air being arranged to travel in opposite directions. It is also manifest that the working surface of the boot 4 is obliquely inclined and this incline is oppositely inclined to the working surface of the intake mouth 5″.

The opposite side walls of the vacuum chamber are provided with openings 9 which communicate with incased suction fans 10, only one of which is shown. The suction fans are provided with discharge trunks 10′, whereby, as indicated by the dotted arrows, air entering through the intake 5″ will travel up through the chute from its delivery mouth across the top portion of the chamber to the fan from which it is discharged. Thus the suction force of the fan will produce a partial vacuum in the chamber 7. The fan and feed roller are shown as being driven by suitable chain and sprocket gear connections, but it is understood that the means for driving these parts do not constitute invention and hence may be driven by any suitable source of energy.

In the operation of the cleaner, it will be apparent that the pea product delivered from the viner is discharged directly into the hopper and from there is fed into the boot, by the action of the roller 2, in a direct stream and from the boot it is discharged into the lower portion of the chute 5 at the discharge point, and at its point of entrance within the boot it is subjected to a current of air traveling in the opposite direction to thus comb or cleanse the product from any foreign substance that is sufficiently light to be lifted by the air blast. All of the foreign substance with the exception of, possibly, heavy sand, is thereby extracted from the product and as it travels from the delivery mouth of the chute toward the fan opening, it will, by gravity, drop into the settling compartment of the vacuum chamber. The full pods and hulled peas will, with possibly a small quantity of heavy sand, be discharged from the intake mouth of the chute to a grader and separator of any type, as previously mentioned.

While I have described in all of its minute details, one apparatus embodying the features of my invention, it is understood that I may vary the structural features within the scope of the skilled mechanic without departing from the spirit of said invention. It will also be understood that, under some circumstances, I may construct the pea cleaner with the grader and separator constituting part of the same without departing from the spirit of my invention and in this type of machine where the two are combined, it is my intention to install the fine separator and grader screens partially within the chamber.

I claim:

A green pea cleaner including a settling and storage chamber, an upwardly extending chute at the front of the chamber and communicating with the upper front portion thereof, means for exhausting air from the chamber, a hopper disposed forwardly of the chute and having an open bottom portion, a feeding member arranged under said open bottom portion of the hopper, the outer wall of the chute being provided with a slot below the member, and a boot normally open at its upper end to the atmosphere having its outer wall disposed at the lower edge of the slot and lying in a plane oblique with respect to the chute, said boot inclosing the feed roller whereby to discharge material obliquely across the chute, the open end of the boot providing for an auxiliary flow of air longitudinally through the boot with the work material to loosen dirt contained in the work material and facilitate detachment of dirt from the work material upon projection of the work material obliquely across the main current of air passing through the chute.

In testimony that I claim the foregoing I have hereunto set my hand at Fredonia, in the county of Ozaukee and State of Wisconsin, in the presence of two witnesses.

JOHN PETER PALLANSCH.

Witnesses:
 KATE L. MEYER,
 MAGGIE FRANZEN.

Copies of this patent may be obtained for five cents each, by addressing the "Commissioner of Patents, Washington, D. C."